United States Patent [19]

Brown, Jr. et al.

[11] 4,385,788
[45] May 31, 1983

[54] ROLLER BEARING AND CONSTRUCTION THEREOF

[75] Inventors: Paul F. Brown, Jr., Bolton; Louis J. Dobek, Somers; Richard M. Slayton, South Windsor, all of Conn.

[73] Assignee: United Technologies Corporation, Hartford, Conn.

[21] Appl. No.: 277,491

[22] Filed: Jun. 26, 1981

[51] Int. Cl.³ ............................................. F16C 33/66
[52] U.S. Cl. ................................................... 308/187
[58] Field of Search ................. 308/187, 207 R, 216, 308/236, 208, 189 R, 190

[56] References Cited

U.S. PATENT DOCUMENTS

| 2,929,663 | 3/1960 | Hoeltje | 308/187 |
| 4,194,797 | 3/1980 | Hörmann et al. | 308/216 |
| 4,283,096 | 8/1981 | Picard et al. | 308/207 R |

Primary Examiner—Lenard A. Footland
Attorney, Agent, or Firm—Norman Friedland

[57] ABSTRACT

The inner ring of a high speed roller bearing is constructed in three pieces, an inner race sandwiched between side rails. The inner race being the major load carrying member is fabricated from a high strength steel and the side rail elements are constructed from a more ductile steel. All the lubrication and oil cooling passages are judiciously located in the ductile steel constructed side rails. Scoops are provided in proximity to the side rails to aid in the delivering of oil to the lubrication and oil cooling passages.

2 Claims, 1 Drawing Figure

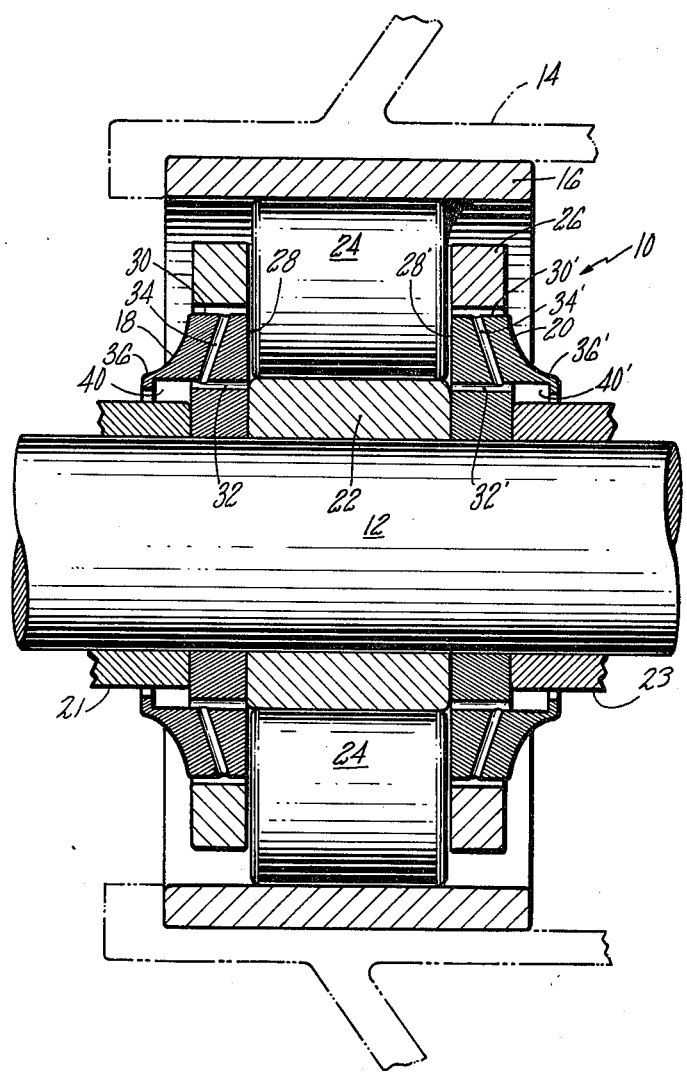

ROLLER BEARING AND CONSTRUCTION THEREOF

CROSS REFERENCE

This patent application relates to the subject matter described in a patent application entitled IMPROVED RELIABILITY ROLLER BEARING filed by James R. Schaefer on even date and assigned to the U.S. Government by mesne assignment from the same assignee of this patent application.

Description

TECHNICAL FIELD

This invention relates to high speed roller bearings and particularly to roller bearings having the inner ring providing the inner race constructed in three separate pieces.

BACKGROUND ART

This type of bearing is particularly efficacious in gas turbine engines where the bearing bore diameter in millimeters times the shaft rotational speed in revolutions per minute (DN) is above two million for supporting the shaft and transmitting radial loads. As gas turbine shaft bearing speeds increase particularly when operating at DN levels in the 2.5 to 3.0 M range, the rotating inner race is subjected to an increasingly unfavorable stress condition that has resulted in rapid race fracture. The acting stress field results from tensile forces produced by a combination of centrifugal effects, thermal effects and the shaft interference fit combined with alternating stresses arising from cyclic roller passing loads. The inner races of these bearings are constructed of a high hardness material (AISI M-50) that has high rolling contact fatigue resistance but which tends to be notch sensitive under tensile type loadings. This notch sensitivity is aggravated by the existence of axial bore slots and intersecting radial holes which are used to supply cooling and lubricating oil to the bearing interior to minimize wear at the cage land and the end surfaces of the roller elements and to maintain bearing thermal stability.

We have found that we can improve the roller bearing having the three piece constructed inner ring type described in the copending patent application cross referenced supra, by fabricating the rolling contact load carrying center section (inner race) from a high strength steel, say M-50 that has no slots or holes and the other two sections which serve to guide the rollers, from a more ductile steel alloy, say AMS6322. By virtue of eliminating the holes and/or slots from the inner race so as not to upset the cross sectional area, the tension and bending strengths are not adversely affected. Further, the two guiding shoulder elements are not similarly subjected to contact fatigue since they only come into contact with the roller ends where the loads are relatively low, thus negating the reason for employing a material that is harder to work and more expensive.

We have found that the bearing life and durability can be improved by judiciously locating the lubricating and oil passages solely in the more ductile and less notch sensitive roller guiding shoulder rings. OIl capturing scoops cooperating with these passages located at either side of the bearing assembly improve the cooling system by enhancing its axial symmetry. It is contemplated that the scoops be made integral or unitary with the roller guiding shoulder rings or can be included with the other proximity elements that stack up the bearing. Conventional practice is to introduce underrace cooling oil assymetrically; that is from one side only. This approach results in thermally induced distortions of a nature that tends to make the inner race assume a conical shape. This in turn produces a maldistribution of stresses that can cause premature failure and wear out. This new concept eliminates this thermal distortion and will accordingly enhance bearing life.

We have also found that bearing durability and life is enhanced by hard facing of both the roller guiding surface and the outside diameter cage land guiding surface of each shoulder ring to provide adequate wear resistance of the relatively soft ductile steel alloy.

DISCLOSURE OF INVENTION

An object of this invention is to provide an improved roller bearing design which is characterized as having three separate pieces comprising the inner ring.

A feature of this invention is the three piece inner race construction that provides a rolling contact load carrying center section fabricated from a high strength steel that has no slots or holes to detract from its cross section thus increasing its strength both in bending and tension. The other two sections act as guiding shoulders for the rollers and are fabricated from a ductile steel alloy, such as AMS6322.

An additional feature of this invention is hard facing of both the roller guiding surface and the OD cage land guiding surface of each shoulder ring to provide adequate wear resistance of the relatively soft ductile steel alloy.

A still further feature of this invention is the incorporation of all necessary cooling and lubricating oil passages in the ductile and much less notch sensitive roller guiding shoulder rings. A still further feature of this scheme is the axial symmetry of the cooling system provided by introducing oil through capturing scoops located on either side of the bearing assembly. These scoops can be made integral with the roller guiding shoulder rings as illustrated, or can be designed as separate members in the bearing stackup.

This three ring construction is characterized by the fact that the inner race roller contact surface and the faces of the roller guiding shoulder rings are much easier to machine compared to the conventional one piece designs. Thus, the increased tolerances required to provide improved roller guidance and reduced wear for high DN operation are more readily achievable with this configuration.

Other features and advantages will be apparent from the specification and claims and from the accompanying drawings which illustrate an embodiment of the invention.

BRIEF DESCRIPTION OF DRAWINGS

The sole FIGURE is a partial view, partly in section and partly in schematic illustrating the invention incorporated into a conventional type roller bearing.

BEST MODE FOR CARRYING OUT THE INVENTION

While this invention is intended to be utilized in a turbine type power plant it should be understood that this invention has utility in other applications particularly where the DN is over two million. Reference is made to the sole FIGURE showing the roller bearing generally indicated by reference numeral 10 supporting the shaft 12 to the engine casing support 14.

The bearing comprises the outer ring or race 16 suitably supported to housing 14 and the three piece inner ring consisting of the two end guiding shoulders 18 and 20 and inner race 22 disposed in tandem relationship. A plurality of cylindrical roller elements 24 are circumferentially spaced around the axis and are suitably held in spaced relationship by cage 26. Sleeves 21 and 23 are fitted onto shaft 12 and bear up against the guiding shoulders 18 and 20 respectively for urging the outer rings or guiding shoulders 18 and 20 to contact the side edges of inner race 22 and return them in intimate contact relationship.

As was noted above the inner race member 22 is free from any slots or holes so as not to detract from its cross section to avoid adverse strength impacts in both the bending and tension modes. Preferably the inner race which is subjected to the higher loads is fabricated from a relatively high strength steel, namely M-50 and the two roller guiding rings 18 and 20 which are subjected to lesser loads, is fabricated from a more ductile steel alloy, say AMS6322. To enhance the wear resistivity of these rings 18 and 20, it is preferred to hard face both the roller guiding surfaces 28 and 28' and the outer diameter cage land guiding surfaces 30 and 30' respectively.

As will be appreciated from the discussion above, the higher strength steel from which the inner race rolling contact section is constructed is more susceptible to fatigue occasioned by notches or slots, passages and the like. In accordance with the invention, the oil passages are located in the more ductile steel guiding shoulder rings 18 and 20. The lubricating and cooling oil passages 32, 32' and 34, 34' are discretely disposed so that they are in communication with the reservoirs 40, 40' defined by the capturing scoops 36 and 36', located at the outer axial extremity of the guiding shoulder rings 18 and 20 and the horizontal passages 32 and 32' are substantially aligned with the contacting rolling surfaces of the rollers 24 and rotating inner race 22. Furthermore, the radially inclined oil passages 34 and 34' intersect the axial oil passages 32 and 32' at a distance along the length of the axial passages 32 and 32'. The oil passages 32 and 32' are greater in number than the smaller diameter oil passages 34 and 34'. The manner in which these two sets of passages intersect and the relative number of these two sets of passages ensures delivery of oil in controlled proportions to the outside diameter cage land guiding surfaces 30 and 30', and to the roller guiding surfaces 28 and 28'.

Conventional practice is to introduce underrace cooling oil assymetrically; that is from one side only. This approach results in thermally induced distortions of a nature that tends to make the inner race assume a conical shape. This in turn produces a maldistribution of stresses that can cause premature failure and wear out. This new concept eliminates this thermal distortion and will accordingly enhance bearing life. An additional advantage to this three ring concept is that the inner race roller contact surface and the faces of the roller guiding shoulder rings are now much easier to machine compared to the conventional one piece designs. Thus, the increased tolerances required to provide improved roller guidance and reduced wear for high DN operation are more readily achievable with this configuration.

It should be understood that the invention is not limited to the particular embodiments shown and described herein, but that various changes and modifications may be made without departing from the spirit and scope of this novel concept as defined by the following claims.

We claim:

1. A roller bearing for high speed rotor having an inner ring means providing the inner race, an outer ring means providing the outer race and a plurality of cylindrical rollers circumferentially spaced between said inner ring means and said outer ring means, said inner ring means comprising a center ring section sandwiched between two axially spaced outer ring sections, the center ring section being fabricated from a higher strength material relative to the two axially spaced outer ring sections, the axially spaced outer ring sections being fabricated from a more ductile material relative to the center section and means for urging said two outer ring sections and the center ring section to shoulder the adjacent section, lubricating and cooling passages solely in said outer ring sections for leading lubricant internally of said roller bearing each of said outer ring sections carring an axially extending portion extending in a direction remote from said cylindrical rollers and spaced from said urging means for defining an annular recess, lip means depending radially inwardly toward said urging means but spaced therefrom for defining an inlet for admitting lubricant to said recess, and said lubricating and cooling passages includes a plurality of horizontally extending passages for leading lubricant into the inner race provided by said center ring section.

2. A roller bearing as in claim 1 including a cage and a plurality of angularly disposed passages in each of said outer ring sections extending in a generally radial direction for interconnecting at least one of said horizontal extending passages with said cage for leading a portion of said lubrication to said cage and cylindrical roller.

* * * * *